(12) United States Patent
Kong et al.

(10) Patent No.: US 10,523,250 B2
(45) Date of Patent: Dec. 31, 2019

(54) SYSTEMS AND METHODS FOR MITIGATING INTERMODULATION EFFECTS

(71) Applicant: Apple Inc., Cupertino, CA (US)

(72) Inventors: Daniel Kong, Mountain View, CA (US); William J. Noellert, Los Altos, CA (US); Ali Ghoreishi, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 59 days.

(21) Appl. No.: 15/648,865

(22) Filed: Jul. 13, 2017

(65) Prior Publication Data

US 2018/0069575 A1 Mar. 8, 2018

Related U.S. Application Data

(60) Provisional application No. 62/384,032, filed on Sep. 6, 2016.

(51) Int. Cl.
*H04B 1/10* (2006.01)
*H04B 1/00* (2006.01)
*H04B 1/40* (2015.01)

(52) U.S. Cl.
CPC ............... *H04B 1/10* (2013.01); *H04B 1/005* (2013.01); *H04B 1/40* (2013.01)

(58) Field of Classification Search
CPC .................................. H04B 1/005; H04B 1/10
See application file for complete search history.

(56) References Cited

U.S. PATENT DOCUMENTS

| 5,969,572 A | 10/1999 | Jeong et al. |
| 6,125,268 A * | 9/2000 | Boesch ................. H03D 7/163 455/168.1 |
| 6,188,732 B1 | 2/2001 | Rha |
| 7,379,711 B2 | 5/2008 | Toit |
| 2009/0068974 A1 | 3/2009 | Smith |
| 2014/0364076 A1* | 12/2014 | Cha ........................ H04B 1/10 455/295 |
| 2016/0099733 A1* | 4/2016 | Weissman ............ H04B 17/354 455/114.2 |
| 2018/0048402 A1* | 2/2018 | Schmidt, Jr. ....... H04B 17/0085 |

FOREIGN PATENT DOCUMENTS

WO 01/37424 A1 5/2001

\* cited by examiner

*Primary Examiner* — David Bilodeau
(74) *Attorney, Agent, or Firm* — Fletcher Yoder P.C.

(57) ABSTRACT

A radio frequency system may generate a first signal within a first band and a second signal within a second band for simultaneous transmission. The transceivers may receive a third signal within the first band and a fourth signal within the second band. Antennas may simultaneously wirelessly transmit the first signal and the second signal and wirelessly receive the third signal and the fourth signal. Analog signal processing circuitry elements may operate on the first signal or the second signal, or both. A controller may receive an indication of operating conditions of the radio frequency system and control the phase shifters disposed between at least two of the analog signal processing circuitry elements to reduce an amount of intermodulation distortion occurring on the third signal or the fourth signal, or both.

20 Claims, 8 Drawing Sheets

SYSTEMS AND METHODS FOR MITIGATING INTERMODULATION EFFECTS

CROSS REFERENCE TO RELATED APPLICATIONS

This application is a Non-Provisional Patent Application of U.S. Provisional Patent Application No. 62/384,032, entitled "Systems and Methods for Mitigating Intermodulation Effects", filed Sep. 6, 2016, which are herein incorporated by reference.

BACKGROUND

The present disclosure relates generally to radio frequency systems and, more particularly, to controlling an operation of a radio frequency system to mitigate interference on received signals due to signals being simultaneously transmitted using multiple frequency bands.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often include a radio frequency system to facilitate wireless communication of data with another electronic device and/or a network. To facilitate wireless communication, the radio frequency system may include multiple inter-band communication capabilities that enable an electronic device to communicate with other electronic devices, wireless access points, cellular base stations, and the like via multiple frequency bands. However, the simultaneous communication via two frequency bands may adversely affect the quality of signals received via the respective frequency bands.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to radio frequency systems used to facilitate wirelessly communicating data. In certain electronic devices, one or more radios operate within a radio frequency system to transmit and receive data to and from other electronic devices, networks, and the like. In some embodiments, the electronic device may include a radio frequency system that is capable of facilitating a multiple (e.g., two) inter-band uplink aggregation. For example, the radio frequency system may support a dual connectivity service to other electronic devices, networks, and the like. Dual connectivity services may involve using two transmitters and/or receivers of an electronic device to simultaneously transmit and/or receive signals at two different Frequency-Division Duplexing (FDD) frequency bands. However, by transmitting signals simultaneously at two different frequency bands, intermodulation distortion (IMD) products may be generated by the two transmission signals, which may fall into the intended receive (Rx) bands received by the receiver. The additional noise caused by the IMD products lowers the sensitivity of the receiver.

With this in mind, in some embodiments, one or more phase shifters may adjust the respective phases of the signals simultaneously being transmitted by two transmitter components within an electronic device to mitigate the effects of the IMD products on the receive (Rx) bands. More specifically, the one or more phase shifters may tune a respective signal being transmitted by each transmitter, such that the IMD product on the receive (Rx) band is reduced (e.g., minimized). In this way, a controller within the electronic device may tune the one or more phase shifters to certain values when certain a pair of signals are being transmitted via a respective pair of frequency bands, such that the IMD products present on signals received via the receive (Rx) bands are mitigated.

BRIEF DESCRIPTION OF THE DRAWINGS

Various aspects of this disclosure may be better understood upon reading the following detailed description and upon reference to the drawings in which.

DETAILED DESCRIPTION

Figure 1:
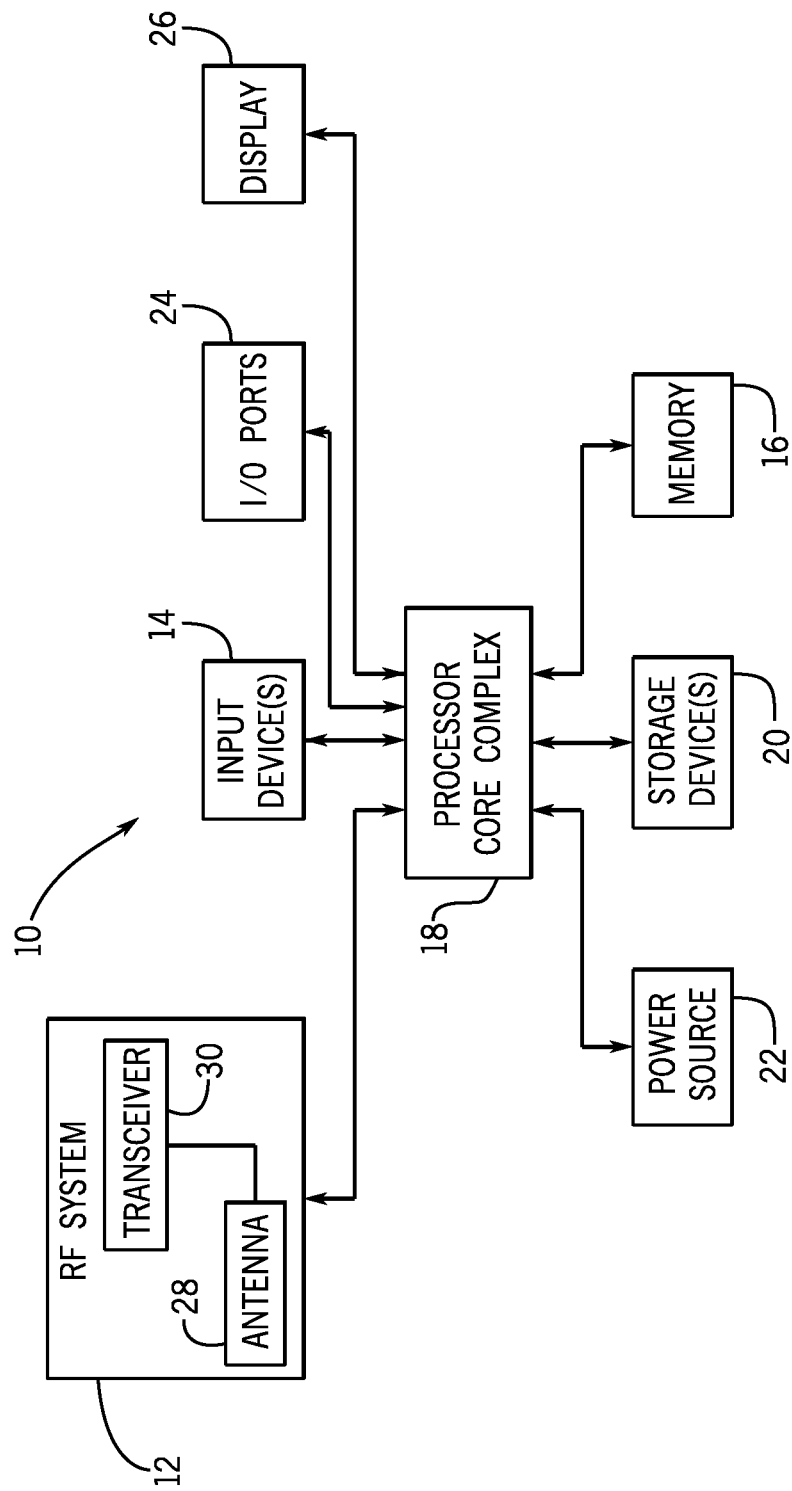
FIG. 1 is a block diagram of an electronic device with a radio frequency system, in accordance with an embodiment.

One or more specific embodiments of the present disclosure will be described below. These described embodiments are only examples of the presently disclosed techniques.

Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

The present disclosure relates to radio frequency systems used to facilitate wirelessly communicating data between an electronic device and another electronic device and/or a network. For example, a radio frequency system may wirelessly communicate data by transmitting radio waves modulated in manner representative of the data, for example, via a personal area network (e.g., Bluetooth network), a local area network (e.g., an 802.11x Wi-Fi network), and/or a wide area network (e.g., a 4G, 5G, or LTE cellular network). In other words, radio frequency systems may utilize various wireless communication protocols to facilitate wireless communication of data.

Regardless of the wireless communication protocol, operation of radio frequency systems may be generally similar. For example, generally, processing circuitry may generate a digital representation of the data to be transmitted as a digital electrical signal and a transceiver (e.g., a transmitter and/or a receiver) may convert the digital electrical signal into an analog electrical signal. In some cases, the radio frequency system may simultaneously transmit multiple signals via multiple distinct frequency bands. However, as discussed above, the simultaneous transmission of multiple signals via different frequency bands may generate intermodulation products that may desensitize the quality of the signals received via a receiver component (Rx) in frequency bands used for receiving signals.

With this in mind, in one embodiment, prior to transmitting signals, one or more phase shifters may apply a phase shift to one or more of the signals simultaneously being transmitted. The phase shifters may be adjusted via a controller that may have access to data that indicates one or more settings for the phase shifters that reduce effects the intermodulation products on the receive (Rx) bands. Additional details with regard to using the phase shifters to reduce the effects of the intermodulation products will be discussed below with reference to FIGS. 1-11.

To help illustrate, one embodiment of an electronic device 10 including a radio frequency system 12 is shown in FIG. 1. As will be described in more detail below, the electronic device 10 may be any suitable electronic device, such as a computer, a mobile phone, a portable media device, a tablet, a television, a virtual-reality headset, a vehicle dashboard, and the like. Thus, it should be noted that FIG. 1 is merely one example of a particular implementation and is intended to illustrate the types of components that may be present in an electronic device 10.

In the depicted embodiment, the electronic device 10 includes the radio frequency system 12, one or more input devices 14, local memory 16, a processor core complex 18, one or more main memory storage devices 20, a power source 22, one or more input/output ports 24, and an electronic display 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 16 and a main memory storage device 20 may be included in a single component.

As depicted, the processor core complex 18 is operably coupled with local memory 16 and the main memory storage device 20. Thus, the processor core complex 18 may execute instruction stored in local memory 16 and/or the main memory storage device 20 to perform operations, such as instructing the radio frequency system 12 to communicate with another electronic device and/or a network. As such, the processor core complex 18 may include one or more general-purpose microprocessors, one or more application specific processors (ASICs), one or more field programmable logic arrays (FPGAs), or any combination thereof.

In addition to the instructions, the local memory 16 and/or the main memory storage device 20 may store data to be processed by the processor core complex 18. Thus, in some embodiments, the local memory and/or the main memory storage device 20 may include one or more tangible, non-transitory, computer-readable mediums. For example, the local memory 16 may include random access memory (RAM) and the main memory storage device 20 may include read only memory (ROM), rewritable non-volatile memory such as flash memory, hard drives, optical discs, and the like.

As depicted, the processor core complex 18 is also operably coupled with the I/O ports 24. In some embodiments, the I/O ports 24 may enable the electronic device 10 to interface with other electronic devices. For example, a portable storage device may be connected to an I/O port 24, thereby enabling the processor core complex 18 to communicate data with a portable storage device.

Additionally, as depicted, the processor core complex 18 is operably coupled to the power source 22. In some embodiments, the power source 22 may provide power to one or more components in the electronic device 10, such as the processor core complex 18 and/or the radio frequency system 12. Thus, the power source 22 may include any suitable energy source, such as a rechargeable lithium polymer (Li-poly) battery and/or an alternating current (AC) power converter.

Furthermore, as depicted, processor core complex 18 is operably coupled with the input devices 14. In some embodiments, the input devices 14 may facilitate user interaction with the electronic device 10, for example, by receiving user inputs. Thus, the input devices 14 may include a button, a keyboard, a mouse, a trackpad, and/or the like. Additionally, in some embodiments, the input devices 14 may include touch-sensing components in the electronic display 26. In such embodiments, the touch-sensing components may receive user inputs by detecting occurrence and/or position of an object touching the surface of the electronic display 26.

In addition to enabling user inputs, the electronic display 26 may display image frames, such as a graphical user interface (GUI) for an operating system, an application interface, a still image, or video content. As depicted, the electronic display 26 is operably coupled to the processor core complex 18. In this manner, the electronic display 26 may display image frames based at least in part on image data received from the processor core complex 18.

As depicted, the processor core complex 18 is also operably coupled with the radio frequency system 12. As described above, the radio frequency system 12 may facilitate wirelessly communicating data with another electronic device and/or a network. For example, the radio frequency system 12 may enable the electronic device 10 to communicatively couple to a personal area network (PAN), such as a Bluetooth network, a local area network (LAN), such as an 802.11x Wi-Fi network, and/or a wide area network (WAN), such as a 4G, 5G, or LTE cellular network. In other words, the radio frequency system 12 may enable wirelessly communicating data using various communication protocols and/or at various output powers (e.g., strength of transmitted analog electrical signals).

In some embodiments, the radio frequency system 12 may include one or more antennas 28, and at least one of the antennas 28 may have a number of antenna sectors, which contain at least one or more antenna elements. The radio frequency system 12 thus may transmit and/or receive signals via the one or more antennas 28 using one or more antenna sectors. In addition, the radio frequency system 12 may include one or more transceivers 30, which may transmit and/or receive signals. The transceivers 30 may be capable of simultaneously transmitting and/or receiving signals using multiple frequency bands. As such, the transceivers 30 may enable the electronic device 10 to communicate with other devices such as Wi-Fi devices, global positioning system (GPS) devices, cellular devices, Bluetooth® devices, and the like.

The transceiver 30 may convert a digital electrical signal, which digitally represents data to be transmitted, into an analog electrical signal, thereby generating an analog representation of the data. Additionally, the radio frequency system 12 may use an amplifier device to amplify the analog electrical signal to a target output power, thereby generating an amplified analog electrical signal. Based at least in part on the amplified analog electrical signal, the radio frequency system 12 may output modulated radio waves to wirelessly communicate the data to another electronic device and/or a network. Due to similarities in operational principles, the techniques described herein may be applicable to any suitable radio frequency system 12 regardless of communication protocol.

Figure 2:
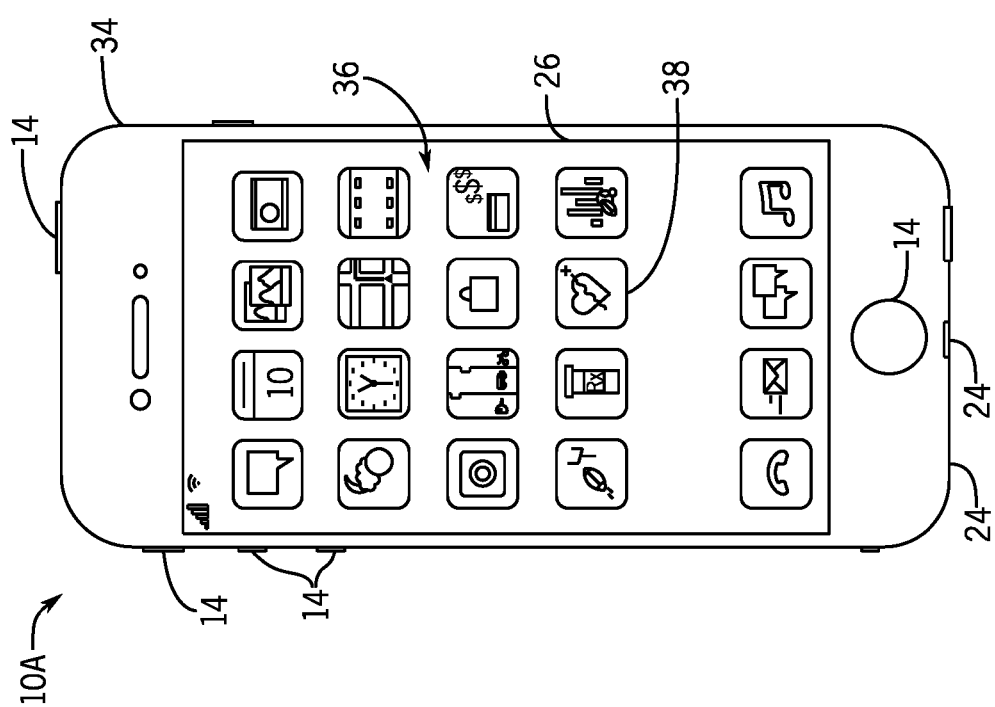
FIG. 2 is a front view of a hand-held device representing an example of the electronic device of FIG. 1, in accordance with an embodiment.

As described above, the electronic device 10 may be any suitable electronic device. To help illustrate, one example of a suitable electronic device 10, specifically a handheld electronic device 10A, is shown in FIG. 2. In some embodiments, the handheld electronic device 10A may be a portable phone, a media player, a personal data organizer, a handheld game platform, and/or the like. For example, the handheld electronic device 10A may be a smart phone, such as any iPhone® model available from Apple Inc.

As depicted, the handheld electronic device 10A includes an enclosure 34 (e.g., housing). In some embodiments, the enclosure 34 may protect interior components from physical damage and/or shield them from electromagnetic interference. Thus, a radio frequency system 12 (not shown) may also be enclosed within the enclosure 34 and internal to the handheld electronic device 10A. In some examples, the enclosure 34 may operate as part of the antenna 28 of the radio frequency system 12.

Additionally, as depicted, the enclosure 34 may surround the electronic display 26. In the depicted embodiment, the electronic display 26 is displaying a graphical user interface (GUI) 36 having an array of icons 38. By way of example, when an icon 38 is selected either by an input device 14 or a touch-sensing component of the electronic display 26, an application program may launch.

Furthermore, as depicted, input devices 14 open through the enclosure 34. As described above, the input devices 14 may enable a user to interact with the handheld electronic device 10A. For example, the input devices 14 may enable the user to activate or deactivate the handheld electronic device 10A, navigate a user interface to a home screen, navigate a user interface to a user-configurable application screen, activate a voice-recognition feature, provide volume control, and/or toggle between vibrate and ring modes. As depicted, the I/O ports 24 also open through the enclosure 34. In some embodiments, the I/O ports 24 may include, for example, an audio jack to connect to external devices.

Figure 3:
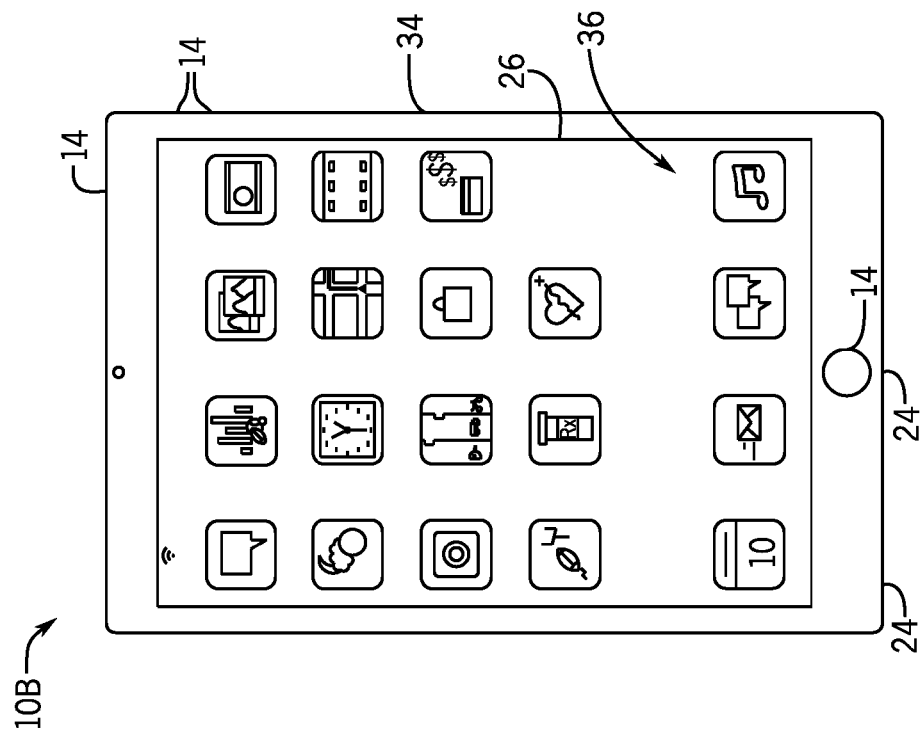
FIG. 3 is a front view of another hand-held device representing another example of the electronic device of FIG. 1, in accordance with an embodiment.
Figure 4:
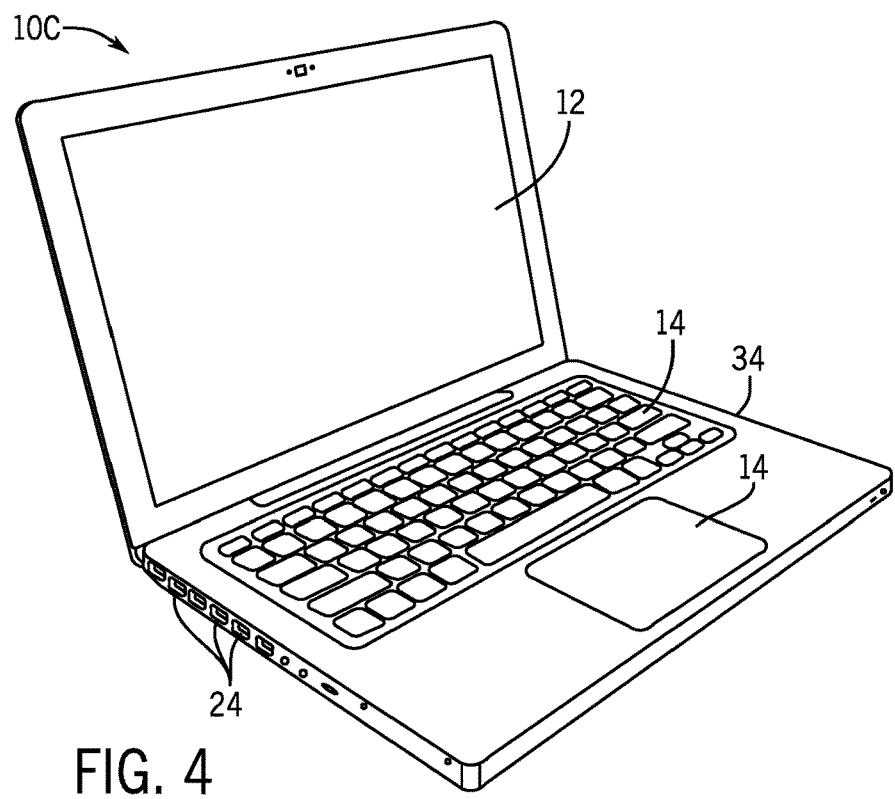
FIG. 4 is a perspective view of a notebook computer representing another example of the electronic device of FIG. 1, in accordance with an embodiment.
Figure 5:
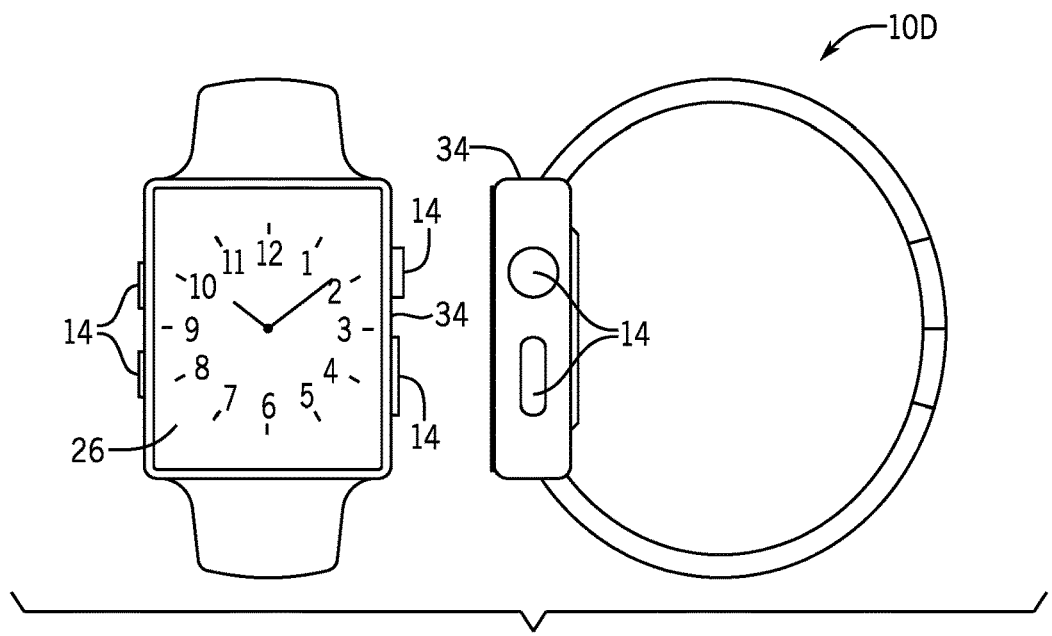
FIG. 5 is a front view of a wearable electronic device representing another example of the electronic device of FIG. 1, in accordance with an embodiment.

To further illustrate, another example of a suitable electronic device 10, specifically a tablet electronic device 10B is shown in FIG. 3. For example, the tablet electronic device 10B may be any iPad® model available from Apple Inc. A further example of a suitable electronic device 10, specifically a computer 10C, is shown in FIG. 4. For example, the computer 10C may be any Macbook® or iMac® model available from Apple Inc. Another example of a suitable electronic device 10, specifically a watch 10D, is shown in FIG. 5. For example, the watch 10D may be any Apple Watch® model available from Apple Inc.

As depicted, the tablet electronic device 10B, the computer 10C, and the watch 10D each also include an electronic display 26, input devices 14, I/O ports 24, and an enclosure 34. Thus, in some embodiments, the enclosure 34 may enclose a radio frequency system 12 in the tablet electronic device 10B, the computer 10C, and/or the watch 10D. As described above, a radio frequency system 12 may facilitate wirelessly communicating data with other electronic devices and/or a network.

As discussed above, the transceiver 30 may simultaneously transmit multiple signals via multiple frequency bands to communicate with a variety of electronic devices. When two or more signals are being transmitted at the same time, the signals may combine as intermodulation products, which may interfere with the signals being received via other frequency bands. As such, the presently disclosed systems and techniques are related to mitigating the interference of signals being received via one set of frequency bands due to the signals being simultaneously being transmitted via a different set of frequency bands.

Figure 6:
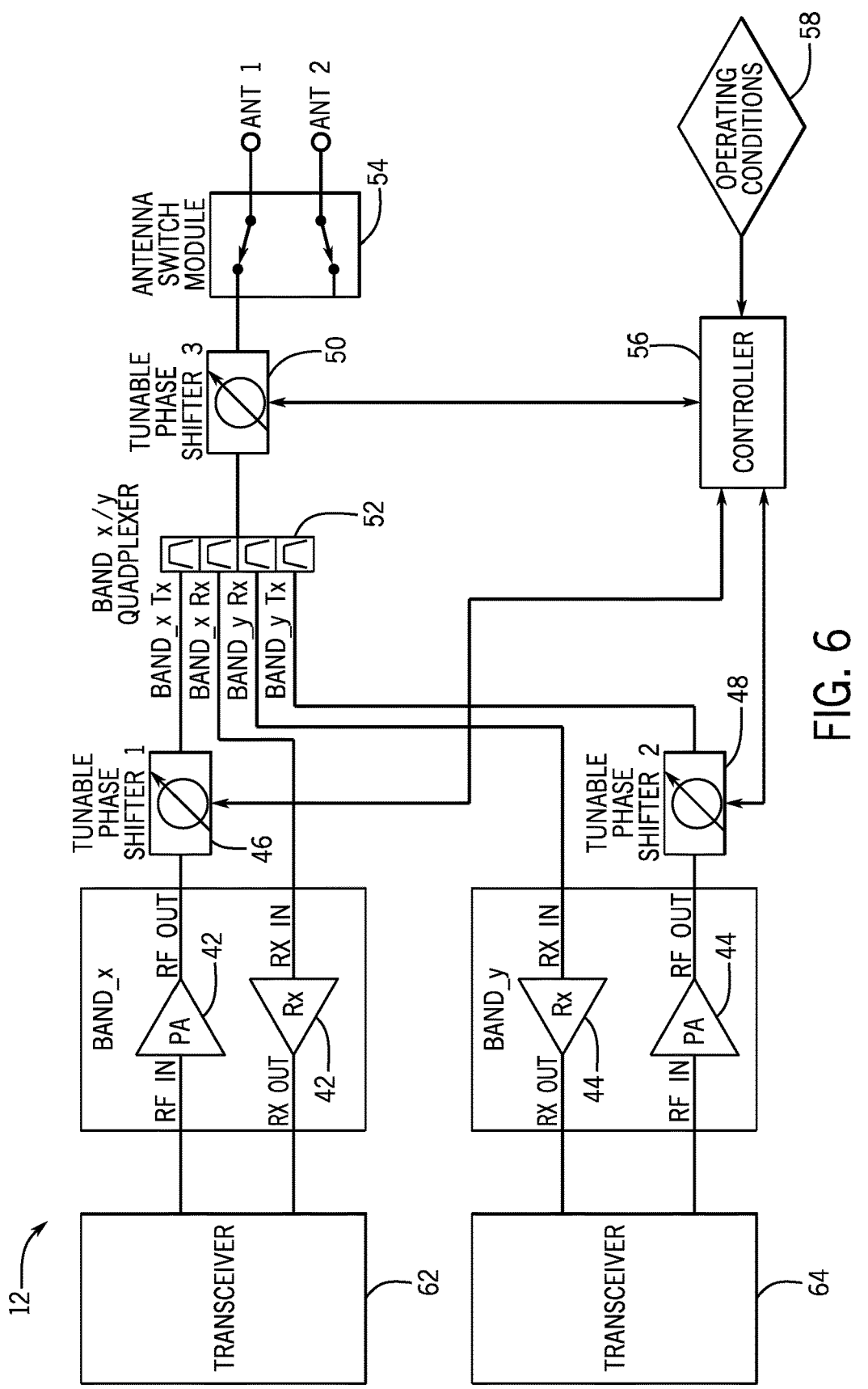
FIG. 6 illustrates a block diagram of components that are part of the radio frequency system of the electronic device 10 of FIG. 1, in accordance with an embodiment.

With the foregoing in mind, FIG. 6 illustrates a block diagram of components that are part of the radio frequency system 12 of the electronic device 10. As shown in FIG. 6, the radio frequency system 12 may include power amplifiers 42 and 44; phase shifters 46, 48, and 50; a quadplexer 52, and an antenna switch module 54. In some cases, a first transceiver 62 may use a first frequency band (e.g., Band X) to transmit and/or receive signals, while a second transceiver 64 may transmit and/or receive signals using a second frequency band (e.g. Band Y). For instance, FIG. 7 illustrates an example representation of frequency bands assigned for use by the two example transceivers 62 and 64.

Figure 7:
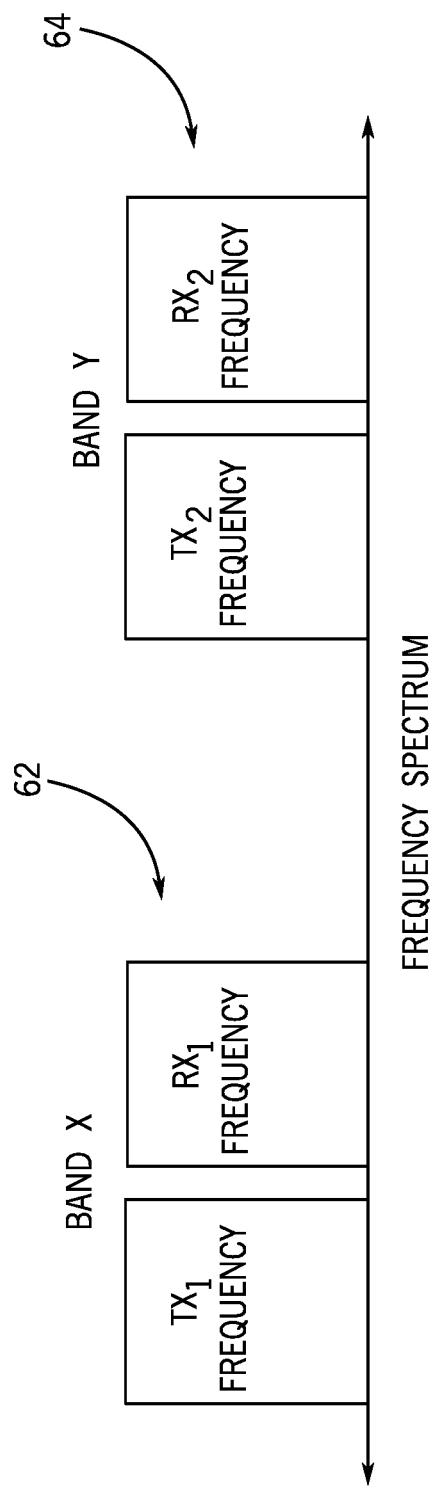
FIG. 7 illustrates an example representation of frequency bands assigned for use by two transceivers, in accordance with an embodiment.

As shown in FIG. 7, the first transceiver 62 may operate on a frequency band that is lower than the frequency band employed by the second transceiver 64.

Figure 8:
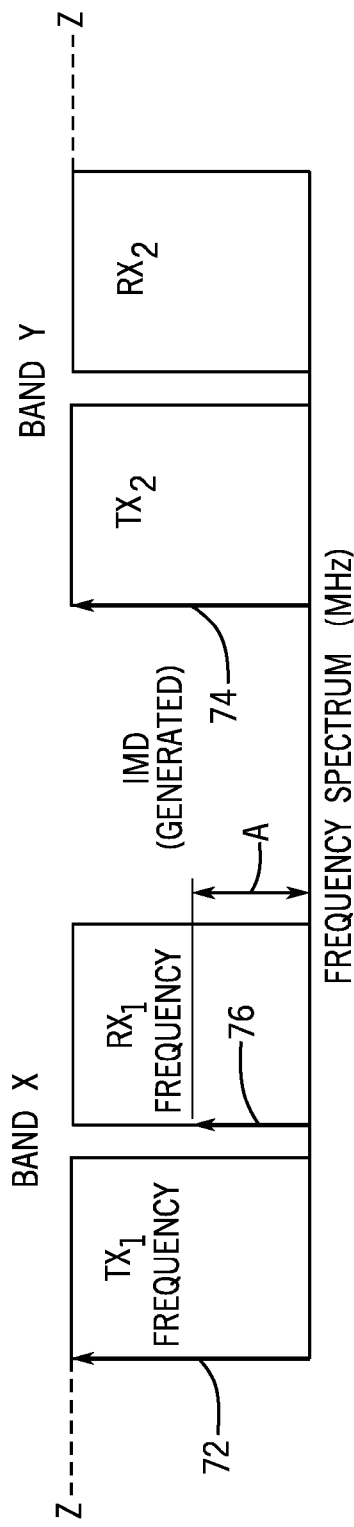
FIG. 8 illustrates an example representation of an intermodulation signal produced in one frequency band due to the transmission of signals in two frequency bands by two transceivers, in accordance with an embodiment.

Keeping this in mind and referring to FIG. 8, when the first transceiver 62 and the second transceiver 64 are simultaneously transmitting signals 72 and 74, respectively, at approximately magnitude Z, an intermodulation product 76 is generated in the receive band of the first transceiver 62 at magnitude A. The intermodulation product 76 may be generated due to the two signals simultaneously being transmitted via the first and second transceivers 62 and 64. For instance, the power amplifiers 42 and 44 may introduce nonlinearities in the process of amplifying signals received via the transceivers 62 and 64. In the same manner, the quadplexer 52 may also introduce nonlinearities when multiplexing between signals being transmitted and received via the transceivers 62 and 64. Although the quadplexer 52 is described as being part of the radio frequency system 12, it should be noted that the quadplexer 52 may be replaced with any suitable multiplexing (e.g., multiplexer) device.

In any case, these nonlinearities may fall beyond the bounds of the bands or channels to which the transmitted signals belong, combining to form the intermodulation product 76, which may exist in frequency bands assigned to the receive portion (e.g., $RX_1$ and/or $RX_2$) of one of the frequency bands. In other words, as the two signals are simultaneously transmitted via the first and second transceivers 62 and 64, intermodulation products will be created by certain components (e.g., power amplifier 42 and 44, quadplexer 52, etc.). The amplitude and frequency of the intermodulation distortion product will be determined based on the non-linear properties of each of these components. Some of the distortion products may fall in the frequency bands assigned to the desired receiver portion.

Figure 9:
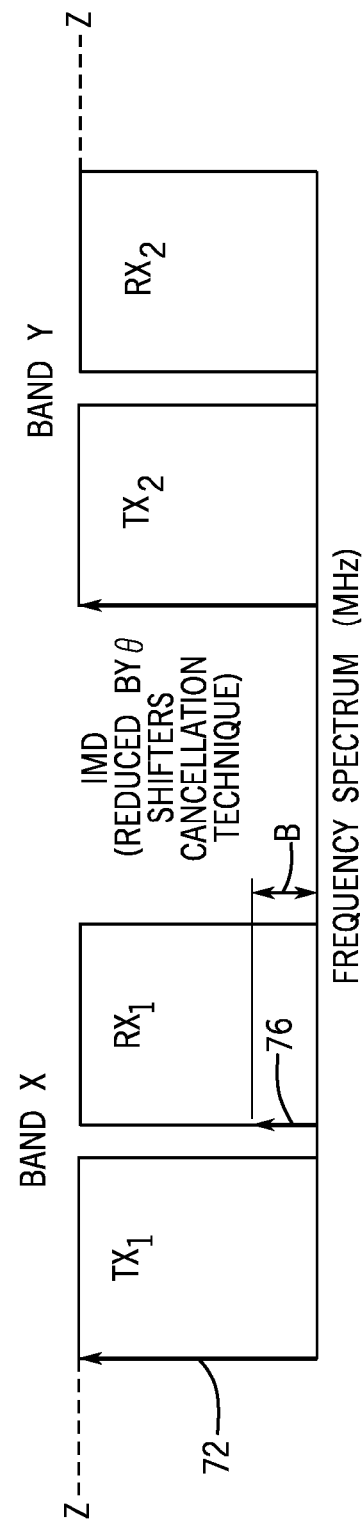
FIG. 9 illustrates an example representation of an intermodulation signal produced in one frequency band due to the transmission of signals in two frequency bands by two transceivers, in accordance with an embodiment.

To mitigate the influence or magnitude of the intermodulation product 76, the radio frequency system 12 may use phase shifters 46, 48, and/or 50 to adjust the phase of signals transmitted by the transceivers 62 and/or 64. For instance, the signal designated to be transmitted by the first transceiver 62 may be phase shifted by the phase shifter 46 a certain amount prior to being transmitted via the antenna 28. By shifting the phase of the signal to be transmitted, the non-linear components of the signal may also be phase shifted, such that the resulting intermodulation product 76 may be reduced to magnitude B, which is lower than magnitude A, as illustrated in FIGS. 8 and 9.

The phase shifters 46, 48, and 50 may include any suitable phase shifting circuit component that may adjust the phase of an input signal. Each phase shifter 46, 48, and 50 may shift the phase of a respective signal in either a positive or negative direction. In one embodiment, the phase shifters 46, 48, and 50 may be software-driven components such as a variable or tuning capacitor that may change values based on received input. In any case, the phase shifters 46, 48, and 50 may individually adjust a respective phase of a respective signal that it may receive.

With the foregoing in mind, it should be noted that although three phase shifters (e.g., 46, 48, 50) are illustrated as part of the radio frequency system 12, in some embodiments fewer phase shifters may be included within the radio frequency system 12. Moreover, additional phase shifters may also be employed by the radio frequency system 12 to assist in mitigating the intermodulation product 76. For instance, phase shifters may be included between the antenna switch module 54 and the antennas 28.

Regardless of the number of phase shifters that are present in the radio frequency system 12, in one embodiment, a controller 56 may control the operation or positions of each phase shifter 46, 48, and/or 50 to mitigate or reduce the intermodulation product 76 presence in a receive portion (e.g., $RX_1$, $RX_2$) of a frequency band. The controller 56 may be part of the processor core complex 18 or may be capable of performing substantially similar operations.

The controller 56 may be used to calibrate the phase shifters 46, 48, and 50, such that the intermodulation product generated by the simultaneous transmission of signals by the first transceiver 62 and the second transceiver 64 are reduced. By way of example, the radio frequency system 12 may be calibrated during a manufacturing phase of the electronic device 10. That is, the controller 56 may test various combinations of the simultaneous transmission of signals via two or more transceivers 30 to identify respective phase shift settings for each present phase shifter of the radio frequency system 12 that results in a reduced (e.g., lowest) magnitude intermodulation product being produced in receive bands.

Figure 10:
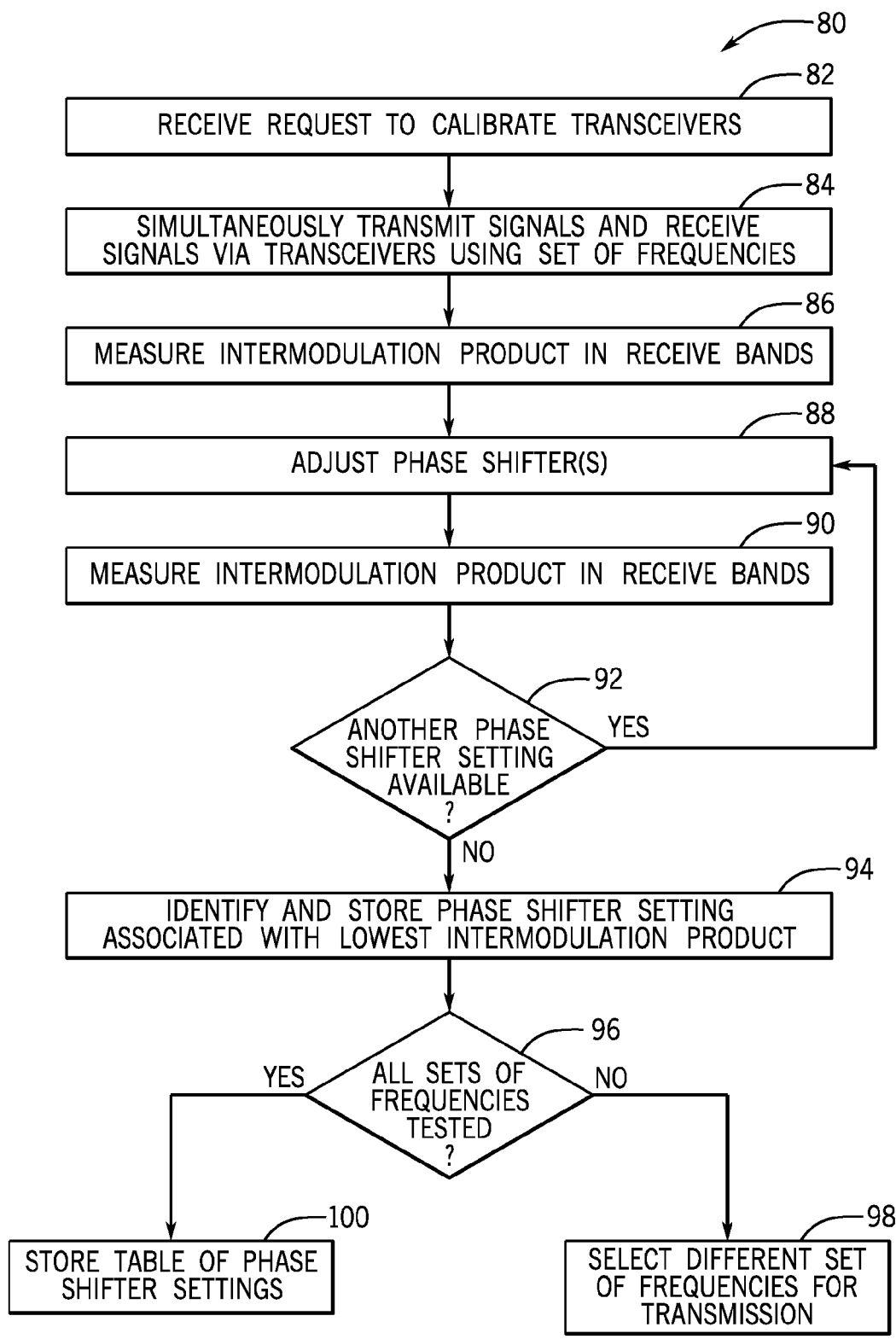
FIG. 10 illustrates a flow chart of a method for calibrating the simultaneous transmission of signals using the electronic device of FIG. 1, in accordance with an embodiment.

By way of example, FIG. 10 illustrates a flow chart of a method 80 for calibrating the phase shifters 46, 48, or 50 of the radio frequency system 12. In one embodiment, at block 82, the controller 56 may receive a request to calibrate the transceivers 30 to mitigate the effects of any generated intermodulation products on receive bands. The request may be provided during a manufacturing phase of the electronic device 10 or the like. Generally, the method 80 may enable the controller 56 to identify and store settings of the phase shifters 46, 48, and 50 to use when the transceivers 30 are simultaneously transmitting signals, such that the transceivers 30 may also simultaneously receive signals that are minimally desensitized.

At block 84, the controller 56 may simultaneously transmit signals via respective transmit frequency bands (e.g., $TX_1$ of Band X and $TX_2$ of Band Y) to a base station or other electronic device, while also receiving signals from the base station or other electronic device. The controller 56 may cause the transceivers 30 to transmit each respective signal in a respective frequency range or using a respective frequency value. In the same manner, the transceivers 30 may receive signals via a respective frequency range or according to a respective frequency value. In any case, the set of frequency values used to transmit and receive signals may be tracked and stored by the controller 56.

At block 86, the controller 56 may measure the intermodulation products that are present in the receive bands. That is, the controller 56 may measure receive quality data (e.g., Receiver Signal Strength Indicator (RSSI)) of the signals received via the receive bands (e.g., $RX_1$ of Band X, $RX_2$ of Band Y) using a number of suitable algorithms or measurement tools. For instance, the controller 56 may measure a strength of the receive signal, an amplitude of the receive signal, or the like. The receive quality signal may thus include intermodulation products embedded within the receive signal. An analysis of the receive quality signal as the settings of the phase shifters 46, 48, and/or 50 change may enable the controller 56 to identify the settings of the phase shifters 46, 48, and/or 50 that results in a higher (e.g., the highest) receive quality for the received signals, thus having a reduced (e.g., the least) amount of intermodulation products embedded therein.

After measuring the intermodulation product, the controller 56, at block 88, may send commands to the phase shifters 46, 48, and/or 50 to adjust a respective setting. As such, the phase shifters 46, 48, and/or 50 may either increase or decrease the phase of the received signals. At block 90, the controller 56 may again measure the intermodulation products present in the received signals, as described above with respect to block 86. In some embodiments, the controller 56 may also adjust the respective settings of the phase shifters 46, 48, and/or 50 based on certain operating conditions 56. The operating conditions 56 may include various operating parameters associated with the electronic device such as temperature, humidity, a distance to a base station, and the like.

At block 92, the controller 56 may determine whether another phase shifter setting is available or has not been tested. If another phase shifter setting combination for the phase shifters 46, 48, and/or 50 is available, the controller 56 may return to block 88 and adjust the settings of the phase shifters 46, 48, and/or 50 and measure the resulting intermodulation products again. The controller 56, in one embodiment, may continue to adjust the phase settings until each setting of the phase shifters 46, 48, and/or 50 has been tested. In other embodiments, the controller 56 may adjust the settings of the phase shifters 46, 48, and/or 50 to certain settings that may be pre-defined or identified by the controller 56 as likely to reduce the presence of intermodulation products. That is, instead of testing each possible combination of settings available to the phase shifters 46, 48, and/or 50, the controller 56 may test a portion of the available settings of the phase shifters 46, 48, and/or 50 to minimize an amount of time that the controller 56 may be testing. Moreover, in some embodiments, certain settings of the phase shifters 46, 48, and/or 50 may be known to reduce intermodulation products 76 based on the frequency ranges in which the transceivers operate. In this situation, the controller 56 may test the settings of the phase shifters 46, 48, and/or 50 that are known to provide the most effective reduction of the intermodulation products 76.

After the controller 56 has tested each setting or the pre-determined settings of the phase shifters 46, 48, and/or 50, the controller 56 may proceed to block 94. At block 94, the controller 56 may identify the settings of the phase shifters 46, 48, and/or 50 that resulted in the lowest intermodulation products being present in the received signals. For example, the controller 56 may identify the settings of the phase shifters 46, 48, and/or 50 that resulted in a higher (e.g., the highest) measured receive quality for the received signals. The controller 56 may then store the identified settings and the corresponding frequency values in which the signals were transmitted and received in a local memory, such as the memory 16 or the storage device 20.

The controller 56 may then, at block 96, determine whether each frequency value or combination of values for transmitting and receiving signals as described in block 84 has been tested. If another combination of frequency values is available, the controller 56 may proceed to block 98 and select a different set of frequencies for transmission and reception of signals and return to block 84 to perform blocks 84-92 using the different set of frequencies. In some embodiments, instead of testing each combination of frequencies, the controller 56 may test a set number of frequency combinations. These combinations may be pre-defined by a user or determined by the controller 56 to be the most likely combinations that may be used by the radio frequency system 12 or may generate the highest amount of intermodulation products.

After each set of frequencies or each pre-defined set of frequencies have been tested, the controller 56 may, at block 100, store a table or data that details a set of settings for the phase shifters 46, 48, and/or 50 and a corresponding set of frequencies employed by the transceivers 30 when transmitting and receiving signals. The stored data may then be accessed by the controller 56, the processor core complex 18, or the like to automatically adjust the settings of the phase shifters 46, 48, and/or 50 when the transceivers simultaneously transmit signals. In some embodiments, the controller 56 may also include data related to the operating conditions 58 detected at the time during which the method 80 is being performed.

Figure 11:
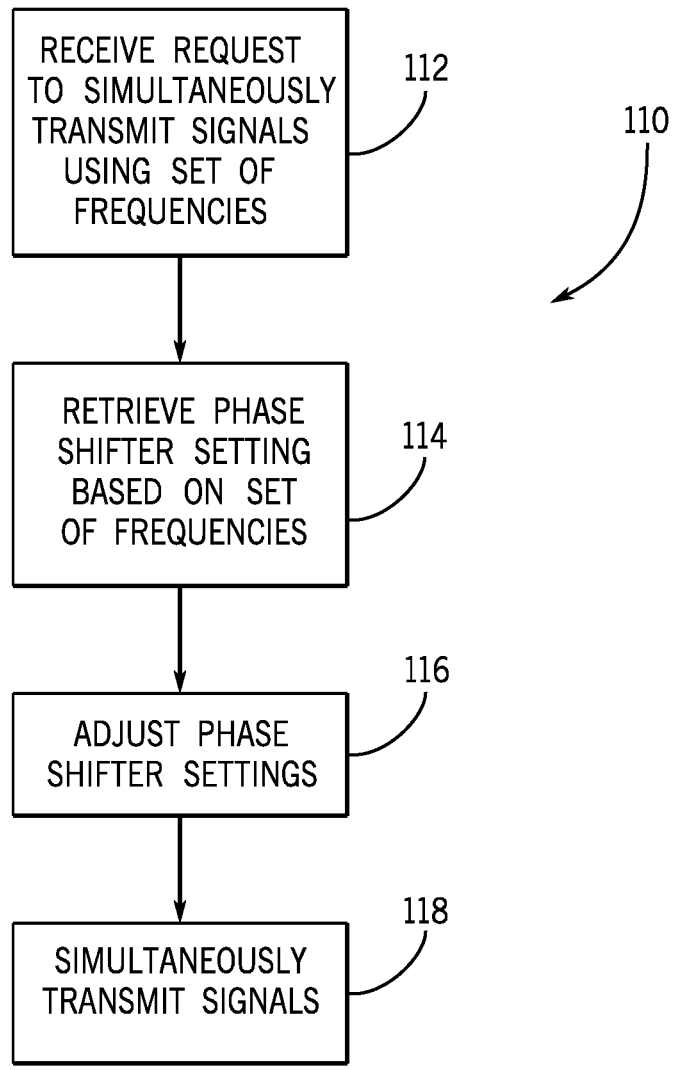
FIG. 11 illustrates a flow chart of a method for simultaneously transmitting signals while mitigating a resulting intermodulation product via the electronic device of FIG. 1, in accordance with an embodiment.

For instance, FIG. 11 illustrates a flow chart of a method 110 for simultaneously transmitting signals via the transceivers 30 using the phase shifters 46, 48, and/or 50. The following description of the method 110 will be detailed as being performed by the controller 56, but it should be understood that any suitable processing device (e.g., processor core complex 18) may perform the method 110.

Referring to FIG. 11, at block 112, the controller 56 may receive a request to simultaneously transmit signals according to a set of frequencies. That is, in one example, the controller 56 may receive a request to transmit a first signal using the first transceiver 62 at a first frequency value and a second signal using the second transceiver 64 at a second frequency value.

At block 114, the controller 56 may retrieve phase shifter settings for the phase shifters 46, 48, and/or 50 based on the set of frequencies being used to transmit the signals from a memory or storage component. The memory or storage component may include a table or data that provides a list of settings for the phase shifters 46, 48, and/or 50 and an associated set of frequencies, as described above.

The controller 56 may then, at block 116, adjust the settings of the phase shifters 46, 48, and/or 50 based on the settings identified at block 114. In some embodiments, the settings may be adjusted using circuitry components such as a look-up table or the like. At block 118, the controller 56 may proceed to send commands to the transceivers 30 to simultaneously transmit the signals after the settings of the phase shifters 46, 48, and/or 50 have been adjusted accordingly. As a result, the intermodulation products that may be present in any signal received by the transceivers 30 while the transceivers are transmitting signals are mitigated to improve the receive quality of the received signals.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device comprising a radio frequency system configured to wirelessly transmit data, wherein the radio frequency system comprises:
   a plurality of transceivers configured to generate a first radio frequency signal within a first band and a second radio frequency signal within a second band for simultaneous transmission by the radio frequency system and receive a third radio frequency signal within the first band and a fourth radio frequency signal within the second band;
   one or more antennas configured to simultaneously wirelessly transmit the first radio frequency signal and the second radio frequency signal and wirelessly receive the third radio frequency signal and the fourth radio frequency signal;
   a plurality of analog radio frequency signal processing circuitry elements configured to operate on the first radio frequency signal or the second radio frequency signal, or both; one or more phase shifters disposed between at least two of the plurality of analog radio frequency signal processing circuitry elements; and a controller configured to: receive a first intermodulation product in the third radio frequency signal, the fourth radio frequency signal, or a combination thereof, and a second intermodulation product in the third radio frequency signal, the fourth radio frequency signal, or the combination thereof; and control the one or more phase shifters to reduce an amount of intermodulation distortion based on the second intermodulation product in response to determining that the second intermodulation product is less than the first intermodulation product.

2. The electronic device of claim 1, wherein a first phase shifter of the one or more phase shifters is configured to adjust a phase of the first radio frequency signal.

3. The electronic device of claim 1, wherein a first phase shifter and a second phase shifter of the one or more phase shifters are configured to adjust a first phase of the first radio frequency signal and a second phase of the second radio frequency signal, respectively.

4. The electronic device of claim 1, comprising a multiplexer configured to receive the first radio frequency signal and the second radio frequency signal, wherein at least one of the one or more phase shifters is configured to receive the first radio frequency signal, the second radio frequency signal, or both after the multiplexer receives the first radio frequency signal and the second radio frequency signal.

5. The electronic device of claim 1, wherein the controller is configured to:
retrieve one or more settings of the one or more phase shifters from a local storage device; and
adjust one or more operations of the one or more phase shifters based on the one or more settings.

6. The electronic device of claim 5, wherein the local storage device comprises data comprising a plurality of settings of the one or more phase shifters, wherein each of the plurality of settings is associated with the first band and the second band.

7. The electronic device of claim 1, wherein one of the at least two of the plurality of analog radio frequency signal processing circuitry elements comprises a power amplifier.

8. The electronic device of claim 1, wherein the one or more phase shifters comprise one or more variable capacitors.

9. A tangible, non-transitory, computer-readable medium configured to store instructions executable by one or more processors of a radio frequency system, wherein the instructions comprise instructions to cause the one or more processors to:
simultaneously transmit a first signal and a second signal using a first transceiver in a first frequency range and a second transceiver in a second frequency range, respectively;
measure a first intermodulation product value in a third signal received via the first transceiver or the second transceiver;
adjust one or more settings of one or more phase shifters to a first set of positions, wherein the one or more phase shifters are configured to receive the first signal, the second signal, or both;
measure a second intermodulation product value in the third signal received via the first transceiver or the second transceiver; and
store the first set of positions, the first frequency range, and the second frequency range in a memory when the second intermodulation product value is less than the first intermodulation product value.

10. The computer-readable medium of claim 9, wherein the instructions to cause the one or more processors to:
adjust the one or more settings of the one or more phase shifters to a second set of positions;
measure a third intermodulation product value in the third signal received via the first transceiver or the second transceiver; and
store the second set of positions, the first frequency range, and the second frequency range in the memory when the third intermodulation product value is less than the first intermodulation product value and the second intermodulation product value.

11. The computer-readable medium of claim 9, wherein the instructions to cause the one or more processors to:
simultaneously transmit the first signal and the second signal using the first transceiver in a third frequency range and the second transceiver in a fourth frequency range, respectively;
measure a third intermodulation product value in the third signal received via the first transceiver or the second transceiver;
adjust the one or more settings of the one or more phase shifters to a third set of positions;
measure a fourth intermodulation product value in the third signal received via the first transceiver or the second transceiver; and
store the third set of positions, the first frequency range, and the second frequency range in the memory when the third intermodulation product value is less than the fourth intermodulation product value.

12. The computer-readable medium of claim 9, wherein the first intermodulation product value and the second intermodulation product value are determined based on receive quality data associated with the third signal.

13. The computer-readable medium of claim 12, wherein the receive quality data comprises a Received Signal Strength Indicator (RSSI) value.

14. The computer-readable medium of claim 9, wherein the instructions to cause the one or more processors to:
receive a request to simultaneously transmit a fourth signal in the first frequency range and a fifth signal in the second frequency range using the first transceiver and the second transceiver, respectively;
adjust the one or more settings of the one or more phase shifters to the first set of positions based on the first frequency range and the second frequency range; and
transmit the fourth signal and the fifth signal.

15. A method for operating a first radio of a plurality of radios within a radio frequency system, comprising:
receiving, via circuitry, a request to simultaneously transmit a first signal and a second signal to an electronic device using a first transceiver and a second transceiver, respectively, wherein the first signal is configured to be transmitted via a first frequency range and wherein the second signal is configured to be transmitted via a second frequency range;
retrieving, via the circuitry, a first set of positions associated with one or more settings of one or more phase shifters configured to receive the first signal, the second signal, or both, wherein the first set of positions is associated with the first frequency range and the second frequency range;
receiving, via the circuitry, a first intermodulation product in a third signal for the first set of positions, wherein the third signal is configured to be received via the first frequency range, the second frequency range, or both;

receiving, via the circuitry, a second intermodulation product in the third signal for a second set of positions, wherein the second set of positions is associated with one or more settings of the one or more phase shifters configured to receive the first signal, the second signal, or both;

adjusting, via the circuitry, the one or more settings of the one or more phase shifters to the second set of positions in response to determining that the second intermodulation product is less than the first intermodulation product; and transmitting, via the circuitry, the first signal and the second signal.

16. The method of claim 15, wherein retrieving, via the circuitry, the first set of positions comprising accessing a table comprising a plurality of sets of positions for the one or more settings indexed according to a plurality of frequency ranges.

17. The method of claim 16, wherein the table is stored in a local storage device.

18. The method of claim 15, wherein the first set of positions is configured to reduce one or more effects of one or more intermodulation products on a third signal being received via the circuitry.

19. The method of claim 15, wherein the one or more phase shifters comprise one or more variable capacitors.

20. The method of claim 16, wherein a first phase shifter of the one or more phase shifters is configured to adjust a phase of the first signal.

* * * * *